United States Patent [19]

Matty et al.

[11] Patent Number: 4,458,185
[45] Date of Patent: Jul. 3, 1984

[54] PROPULSION CONTROL APPARATUS FOR PASSENGER VEHICLES

[75] Inventors: Thomas C. Matty; Dennis E. Whalen, both of North Huntingdon; William E. Schmitz, Wilkinsburg; Pamela E. De Tine, West Mifflin, all of Pa.

[73] Assignee: Westinghouse Electric Corp., Pittsburgh, Pa.

[21] Appl. No.: 500,217

[22] Filed: Jun. 2, 1983

[51] Int. Cl.³ .............................................. H02P 1/20
[52] U.S. Cl. ...................... 318/270; 318/60; 318/61; 318/275; 318/317; 318/395
[58] Field of Search ............... 318/59, 60, 61, 269, 318/270, 274, 385, 395, 317; 364/426; 180/178, 179

[56] References Cited
U.S. PATENT DOCUMENTS

| | | | |
|---|---|---|---|
| 3,218,537 | 11/1965 | Stamm | 318/274 |
| 3,271,649 | 9/1966 | Juergensen | 318/269 |
| 3,581,172 | 5/1971 | Tsuboi | 318/274 X |
| 3,911,343 | 10/1975 | Oster | 318/395 |
| 4,282,466 | 8/1981 | Matty | 318/434 |

*Primary Examiner*—B. Dobeck
*Assistant Examiner*—Bentsu Ro
*Attorney, Agent, or Firm*—R. G. Brodahl

[57] ABSTRACT

A cam controller for determining the operation of an electric motor is coupled with a stepping motor to provide predetermined positional movements of the cam controller in response to a desired electric motor operation control signal and in accordance with a programmed microprocessor determined comparison of the actual electric motor current with a requested current related to the desired operation control signal.

10 Claims, 17 Drawing Figures

PROPULSION CONTROL APPARATUS FOR PASSENGER VEHICLES

BACKGROUND OF THE INVENTION

It is known in the prior art to provide a propulsion control system which uses resistors connected in series with one or more DC traction motors to control the acceleration of a transit car. This has been accomplished with a cam controller, which selectively shorts out each of a first plurality of resistors during the acceleration phase of the vehicle control operation and selectively shorts out each of a second plurality of resistors during the brake phase, as disclosed in U.S. Pat. No. 3,218,537. This was mechanically done by respective sets of power contact tips that are located around a rotating shaft on which is placed a series of cam lobed devices. As the shaft rotates, different sets of contact tips are made and broken to accomplish the electrical connections that are required to do the desired resistor shorting. The cam shaft was rotated by an air cylinder through a rack and pinion gear arrangement.

A stepping motor has been known in the prior art for several years, and has the ability to rotate a shaft to a specific desired angular position as a result of a specific number of input pulses that are supplied to the windings of the stepping motor. This gives accurate control to provide a desired angular motion of the motor and the coupled shaft, without requiring feedback signals and circuitry to control the angular position that is desired.

In addition it is known to utilize a microprocessor to control the operation of chopper propulsion apparatus for transit vehicles as disclosed in U.S. Pat. No. 4,282,466 of T. C. Matty. A microprocessor has been provided for operation with the Washington Metropolitan Area Transit Authority or WAMATA cam propulsion system, as disclosed in a U.S. patent application, filed Apr. 29, 1983 and Ser. No. 489,983, by A. Sahasrabudhe et al., but the microprocessor is functioning to determine the speed maintaining and program stop input signals that are supplied to a conventional air cylinder positioned cam propulsion system.

It is known in the prior art to provide an electric motor driven cam propulsion control apparatus, including an electric pilot motor to drive the cam and which is a regular DC motor. A DC pilot motor must be told to turn, it must also be told to stop, and there is required for this purpose an elaborate feedback circuit to properly determine the actual rotational position of that DC pilot motor.

SUMMARY OF THE INVENTION

A stepper motor operative with a programmed microprocessor are provided to control the operation of a cam controller of a propulsion control system for a passenger vehicle, which is more simple and reliable because there is no position feedback required during the rotation of the cam shaft, such that of the prior art air cylinder apparatus interlocks and indicators of cam position can be deleted. The stepping motor has an inherent capability of retaining its position when it has completed the desired number of steps, such that no detents or friction clutches are needed to hold the cam shaft in its position once it completes a desired rotation, and the accuracy that is achieved with the stepping motor is significantly better than what can be achieved with the prior art air drive or pilot motor system to allow the contact tips, which actually carry many hundreds of amperes of motor current, to be in the proper position when the motor current starts to flow. The prior art air drive or pilot motor apparatus has the necessity of a uniform load on the air rotation device to balance the torque loads that were put on the cam shaft, such that when certain switches were closed, other switches had to be opening, to make the total torque required by the air or pilot motor relatively uniform, and the rotational speed, with the resulting dynamic interactions that affect position accuracy, is inversely affected by the torque. The stepping motor does not have this limitation and enables more flexibility in relation to where the switches are located and the number of switches that are engaged or disengaged at any particular time. In addition there are maintenance advantages using the stepper motor, since there are fewer moving parts and they are rotating parts rather than sliding parts. Because of the high traction motor currents, if the contact tips are not engaged properly and the current starts to flow through them they might burn or pit. The greater positioning accuracy of the controlled stepper motor apparatus of the present invention provides longer life of the contact tips.

DESCRIPTION OF THE PREFERRED EMBODIMENTS

Figures 1, 3:
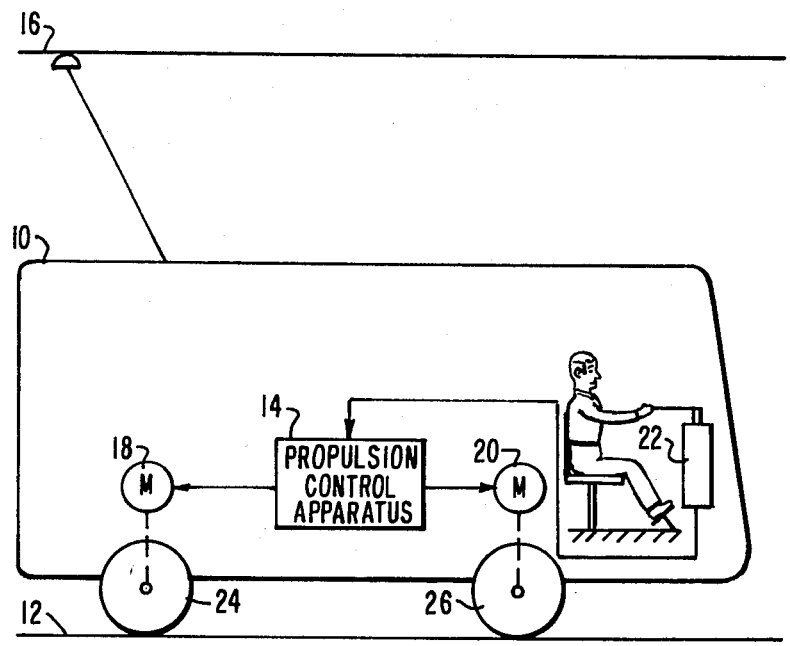
FIG. 1 shows a prior art propulsion control apparatus for a passenger vehicle.
FIG. 3 shows a chart to illustrate the sequence of operation of the resistor shorting switches shown in FIG. 2.

In FIG. 1 there is shown a prior art passenger vehicle 10 movable along a roadway track 12. A propulsion control apparatus 14 is coupled with a power supply 16, such as an overhead line, for controlling the operation of propulsion motors 18 and 20 as determined by an operator controller 22 to determine the rotational acceleration and/or speed of respective vehicle support wheels 24 and 26.

Figure 2:
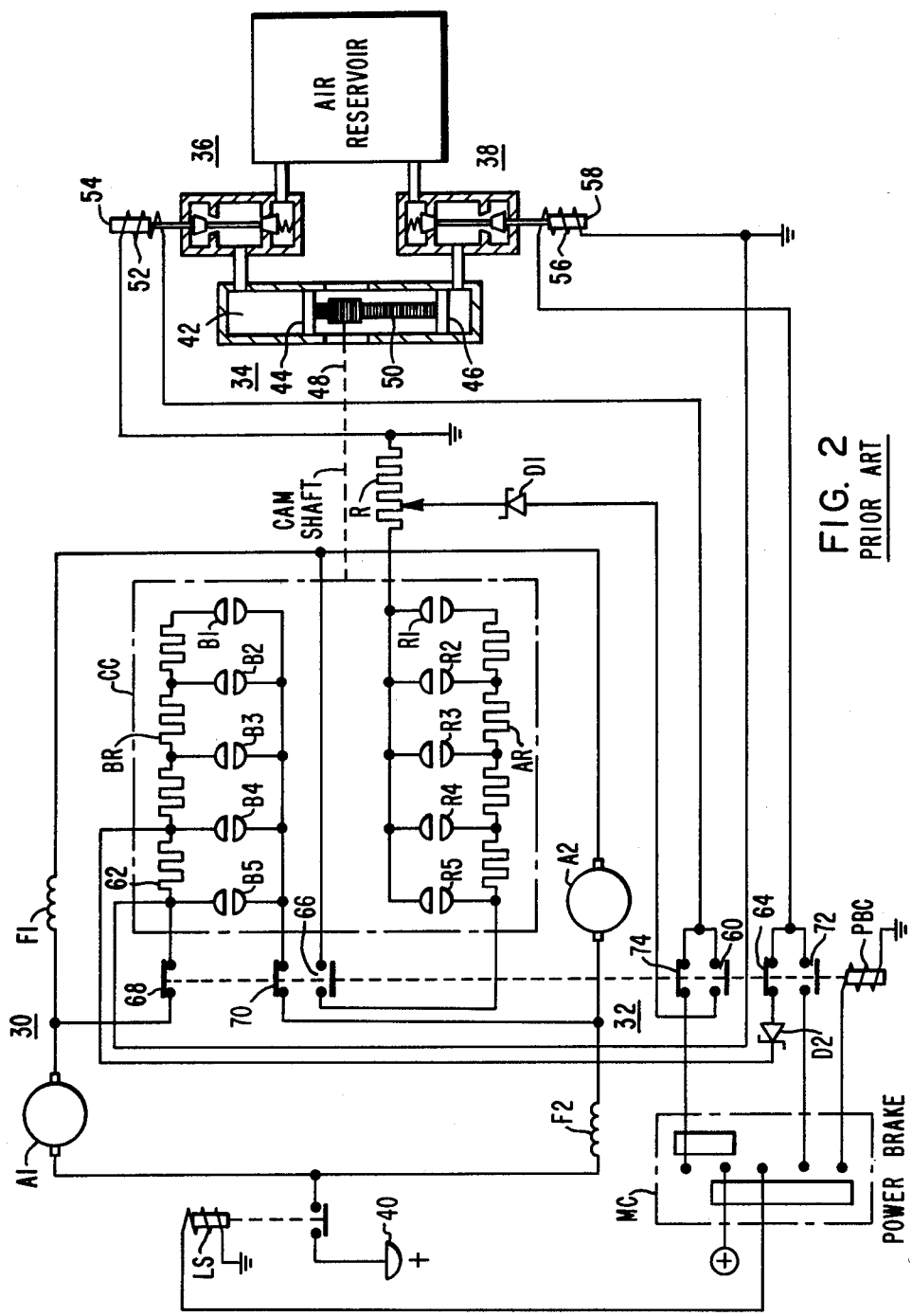
FIG. 2 shows a prior art cam controlled propulsion control apparatus for a passenger vehicle.

In FIG. 2 there is shown a vehicle propulsion control system, such as shown in U.S. Pat. No. 3,218,537 and comprising motors 30 and 32, a line switch LS, a master controller MC, a power-brake control switch PBC, an accelerating resistor AR, a braking resistor BR, a cam controller CC, an air engine 34, and magnet valves 36 and 38. The motors 30 and 32 are shown as the series type suitable for propelling a vehicle. The motor 30 has an armature winding A1 and a series field winding F1. The motor 32 has an armature winding A2 and a series field winging F2. It will be understood that reversing switches of the usual type may be provided for reversing the direction of rotation of the motors 30 and 32.

As shown, the motors 30 and 32 are connected in parallel circuit relation. If desired, control apparatus may be provided for first connecting the motors in series circuit relation, and then in parallel circuit relation during the accelerating cycle of operation. Since these connections are well known in the art, they are not shown in the present drawing.

The line switch LS is provided for connecting the motors to a third rail shoe 40 which engages a third rail, or other suitable power conductor (not shown). The power-brake controller PBC is provided for changing the motor connections from power or accelerating connections to dynamic braking connections. The operation of the line switch LS and the controller PBC is controlled by the master controller MC which may be hand or foot operated.

The accererating resistor AR is provided for controlling the motor current during acceleration of the motors. The braking resistor BR is provided for controlling the motor current during dynamic braking. The accelerating resistor AR is shunted from the motor circuit step-by-step by a plurality of switches R1 to R5 inclusive which are operated by cams of the cam controller CC. Likewise, the braking resistor BR is shunted step-by-step from the motor circuit by a plurality of switches B1 to B5 which are also operated by cams on the cam controller CC.

The shaft of the cam controller CC is driven by the air engine 34. The air engine 34 may be a type well known in the art. The operation of the air engine 34 is controlled by the magnet valves 36 and 38, which control the admission of air to and the discharge of air from a cylinder 42 to operate pistons 44 and 46, thereby driving the cam shaft 48 by means of a rack and pinion 50.

The magnet valve 36 is actuated by electromagnetic means comprising a coil 52 and a core 54. Likewise, the magnet valve 38 is actuated by electromagnetic means comprising a coil 56 and a core 58. The magnet valves 36 and 38 are both of the standard type which admit air to the cylinder 42 from an air reservoir when the coil of the valve is energized and exhaust air from the cylinder 42 when the coil is deenergized.

In order to control the motor current during acceleration, a semiconductor device D1, such as a Zener diode, is provided. Likewise, a Zener diode D2 is provided for controlling the motor current during dynamic braking. The Zener diode D1 is connected to an adjustable reference resistor R which is connected in the motor circuit during acceleration of the motors. The diode D1 and the coil 52 of the magnet valve 36 are connected in series circuit relation across the resistor R through contact members 60 of the controller PBC during acceleration of the motors. Thus, the diode D1 is energized by the voltage drop across the resistor R which, in turn, is proportional to the motor current.

The diode D2 is connected in series circuit relation with the coil 56 of the magnet valve 38 across a portion 62 of the resistor BR through contact members 64 of the switch PBC during dynamic braking. Thus, the diode D2 is energized by the voltage drop across the resistor portion 62 which, in turn, is proportional to the motor current during dynamic braking.

Assuming that it is desired to accelerate the motors, the master controller MC is actuated to the "power" position. At this time, the coil of the switch LS is energized to close the switch as shown in FIG. 3 by the circle indication, thereby connecting the motors to the power conductor 40. As previously stated, the motors are operated in parallel circuit relation with the accelerating resistor AR and the resistor R connected in the motor circuit. At this time, the actuating coil of the control switch PBC is also energized to close the contact members 66 of the switch to establish a circuit for connecting the resistor AR and the resistor R in the motor circuit, the contacts 68 and 70 being opened at the same time to interrupt the braking circuit.

The coil 56 of the magnet valve 38 is also energized at this time through contact members 72 of the switch PBC. Thus, air is admitted through the valve 38 to the air engine 34 to raise the piston 46, thereby rotating the cam shaft 48 to close the switch R1 as shown in FIG. 3 and connect the resistors AR and R in the motor circuit. The current flowing in the resistor R creates a certain voltage drop proportional to the current flow. If the adjustable contact on the resistor is set for a high drop, a relatively small amount of current will generate sufficient IR drop to exceed the breakdown voltage of the Zener diode D1. If this happens, the coil 52 of the magnet valve 36 is also energized to admit air to the upper portion of the cylinder 42 of the air engine 34, thereby stopping the upward movement of the pistons 44 and 46. The rotation of the traction motors will build up counter electromotive force which, in turn, reduces the traction motor current. When the current drops to the point at which the IR drop across the resistor R is lower than the breakdown voltage of the Zener diode, current flow to the magnet valve 36 stops and air is permitted to escape from the cylinder 42 causing the cam controller to advance.

The shunting of another step of the resistor AR will cause the traction motor current to increase sufficiently to reach the point where the IR drop again exceeds the Zener diode voltage, thereby stopping movement of the cam controller. This sequence is repeated until the cam controller is fully advanced step-by-step to shunt the resistor AR from the motor circuit.

When the resistor R is adjusted for a low voltage drop, higher currents are needed to reach the Zener breakdown voltage level. Thus, by adjusting the resistor R, low or high accelerating rates can be obtained.

If dynamic braking is desired, the master controller MC is actuated to the "brake" position, thereby deenergizing the actuating coils of the switches LS and PBC. The opening of the switch LS disconnects the motors from the power source and the closing of the contact members 68 and 70 of the switch PBC establishes dynamic braking connections for the motors 30 and 32. At this time, the motors are so connected that the armature A1 of the motor 30 excites the field winding F2 of the motor 32 and the armature A2 excites the field winding F1. The resistor BR is connected in the circuit which is common to both motors, thereby controlling the dynamic braking current.

The pistons 44 and 46 of the air engine 34 were raised to their uppermost position during acceleration of the motors. When the controller MC is actuated to the "brake" position, the coil 52 of the magnet valve 36 is energized through contact members 74 of the switch PBC. Thus, air is admitted to the cylinder 42 to drive the pistons 44 and 46 downward. The voltage drop across the portion 62 of the resistor BR is impressed on the Zener diode D2. When the braking current is sufficient to produce a voltage drop across the resistor portion 62 which exceeds the breakdown voltage of the diode D2, the coil 56 of the magnet valve 38 is energized by the current flowing through the Zener diode D2, thereby admitting air to the lower portion of the cylinder 42 to stop the movement of the pistons 44 and 46. When the dynamic braking current decreases to such a value that the drop across the resistor portion 62 is below the breakdown voltage of the diode D2, the coil 56 is deenergized and air is permitted to exhaust through the magnet valve 38, thereby permitting movement of the cam controller CC to shunt another step of resistance from the motor circuit. This sequence is repeated to shunt the resistors BR from the dynamic braking circuit step-by-step until the cam controller is in the original or off position.

In FIG. 3 there is shown by a circle the energization of the actuation coils of the PBC and LS and the sequential closing of the respective acceleration and brake resistor contacts R1 to R5 and B1 to B5 in relation to the provided acceleration and brake steps of operation.

Figure 4:
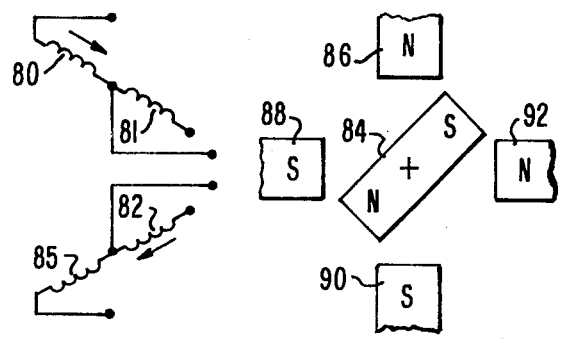
FIG. 4 shows an initial rotational position of the rotor of a prior art stepping motor.
Figure 5:
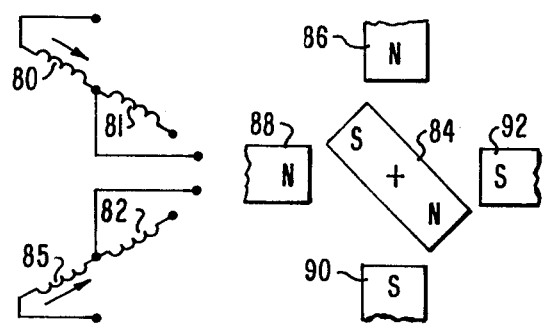
FIG. 5 shows a first change of rotational position of the rotor of a prior art stepping motor.
Figure 6:
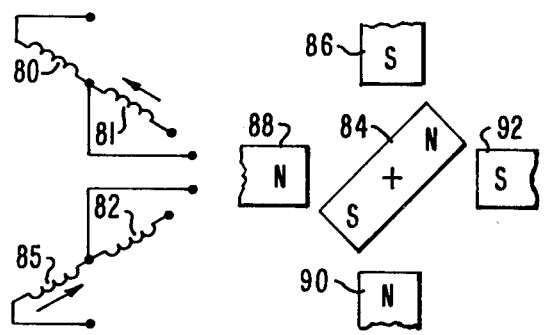
FIG. 6 shows a second change of rotational position of the rotor of a prior art stepping motor.
Figure 7:
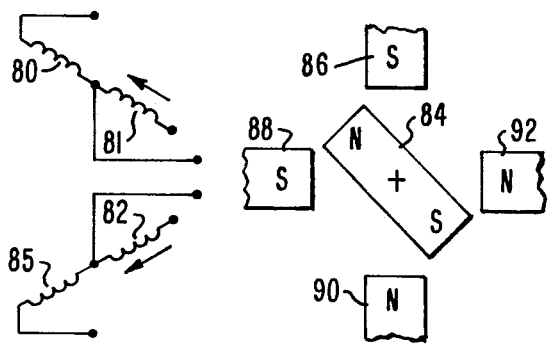
FIG. 7 shows a third change of rotational position of the rotor of a prior art stepping motor.

In FIGS. 4, 5, 6 and 7 there is illustrated the stepped operation of a simple prior art stepper motor. When the field coils 80 and 82 are energized as shown by the arrows in FIG. 4, the permanent magnet rotor 84 aligns itself as illustrated with the south rotor pole between the two north field poles and the north rotor pole between the two south field poles. When the field coils 80 and 85 are energized as shown by the arrows in FIG. 5, the rotor 84 aligns itself as illustrated with the south rotor pole between the two north field poles and the north rotor pole between the two south field poles. When the field coils 81 and 82 are energized as shown by the arrows in FIG. 6, the rotor 84 moves to the position with the south and north rotor poles as illustrated. When the field coils 81 and 85 are energized as shown by the arrows in FIG. 7, the rotor 84 is positioned with the south and north rotor poles as illustrated. When the rotor 84 is again positioned as shown in FIG. 4, the rotor 84 will have rotated through a total of 360 degrees.

Figure 8:
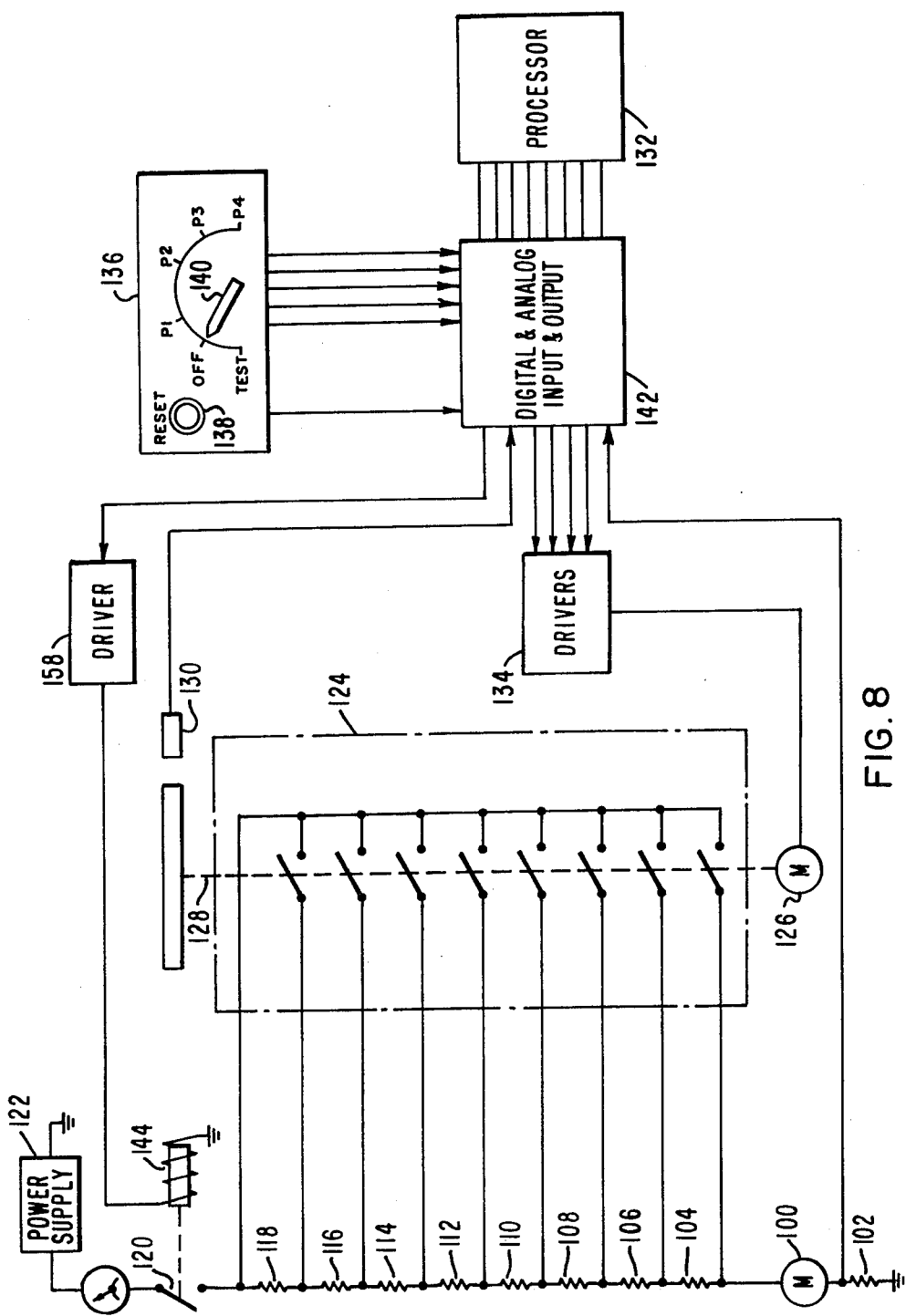
FIG. 8 shows one embodiment of the present invention.

In FIG. 8 there is shown one acceleration control embodiment of the present invention. A propulsion motor 100 is connected to ground through a current shunt 102 and through the series of resistors 104, 106, 108, 110, 112, 114, 116 and 118 and a line switch 120 to a power supply 122. The power supply 122 typically would be a 700 volt DC or a 1000 volt DC voltage picked up off a third rail. A cam unit 124, which can be similar to the PCC cam control unit presently operative with the transit vehicles of WAMATA, and comprising a cam shaft 128 including cams to act upon a set of about 20 main power switches, with eight such sets of switch contacts being shown in FIG. 8 and respectively which shunt the resistors 104, 106, 108, 110, 112, 114, 116 and 118 in series with the traction motor 100 for determining the motor current. The operational characteristic of a DC traction motor, or any series wound DC motor, is such that voltage applied to a stopped motor will result in a high initial current. As the motor speeds up, this current level declines. The operation of the cam propulsion control system is to increase the current level, which is otherwise declining, by removing some of the resistance that is in series with the motor 100. By sequentially shunting out this resistance, a relatively uniform motor current and corresponding vehicle acceleration can be obtained. A stepping motor 126 is shown connected to rotate the shaft 128 of cam unit 124, and a Hall effect zero position switch or sensor 130 is shown located at the other end of the cam shaft 128 and operative with a disc 131 including a magnet or other physical anomaly to generate at only this one position a signal to indicate the zero or starting position of the cam shaft 128. The stepping motor 126 by itself does not know where it is rotationally positioned, so when the microprocessor 132 is initially powered up, it is desirable to drive the stepping motor 126 to this initial zero position of the cam shaft 128 as an initial reference angular position. Thereafter, the microprocessor 132 keeps track of the movement steps that are given to the stepping motor 126 and at all times knows where the stepping motor 126 and the cam shaft 128 are rotationally positioned. A plurality of drivers 134 is shown for the respective field coils of the stepping motor 126, which drivers 134 are provided to convert the low current level logic signals that are generated by the microprocessor 132 to the relatively high current level signals required to operate the stepping motor 126. Typically, the stepping motor 126 of interest here requires from 6 to 9 amperes at 24 volts to operate the cam unit 124, and the motor can comprise a Superior Electric Model No. M112 FJ 327 stepping motor. The drivers 134 include a plurality of commercially available DC solid state relays, which are available from the Douglas Randall Company of Pawcatuck, Conn. as their Model K12B. The controller 136 of the vehicle operator can have a reset button 138 or a reset position of the control handle 140 which causes the stepping motor 126 to rotate back to the desired zero or reference initial position where it is ready for any additional command signals. An accelerometer control 140 is provided with an off position and four illustrative steps of acceleration rate that can be requested. This controller 136 could be the master controller 22 shown in FIG. 1 for a rapid transit vehicle, which the operator would use to control the vehicle acceleration during a propulsion operation. Suitable digital and analog input and output circuits 142 are provided for coupling the control and feedback signals in relation to the microprocessor 132.

Figure 9:
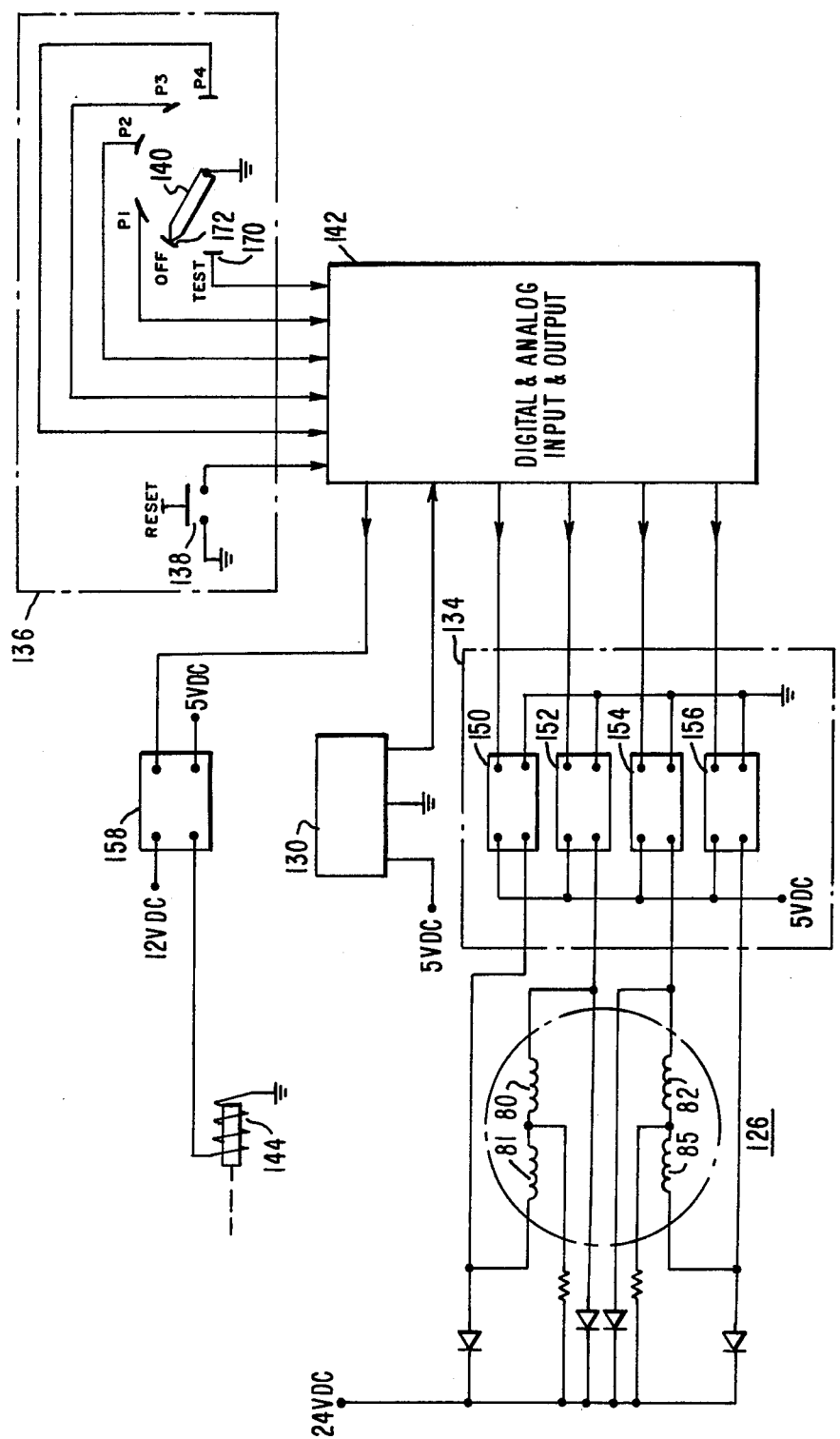
FIG. 9 shows the operation of the drivers shown in FIG. 8 in relation to the stepper motor and the line switch of the present invention.

In FIG. 9 there is shown the provision of the solid state relay drivers in relation to the stepper motor field coils 80, 81, 82 and 85 and to the line switch coil 144. The digital and analog input and output circuits 142 supply the signals from the microprocessor 132 for energizing the respective field coils 80, 81, 82 and 85 of the stepper motor 126. The driver 150 energizes the field coil 81, the driver 152 energizes the field coil 80, the driver 154 energizes the field coil 82 and the driver 156 energizes the field coil 85. In addition the driver 158 energizes the relay coil 144 of the line switch 120.

The operator controller 136 includes the reset switch 138 and a control arm 140 movable to a desired one of a test contact 170, an OFF contact 172, a first acceleration rate contact P1, a second acceleration rate contact P2, a third acceleration rate contact P3 and a fourth acceleration rate contact P4. The Hall effect zero position sensor 130 is shown for providing an input signal when the cam shaft 128 is in the initial zero or reference position.

Figure 10:
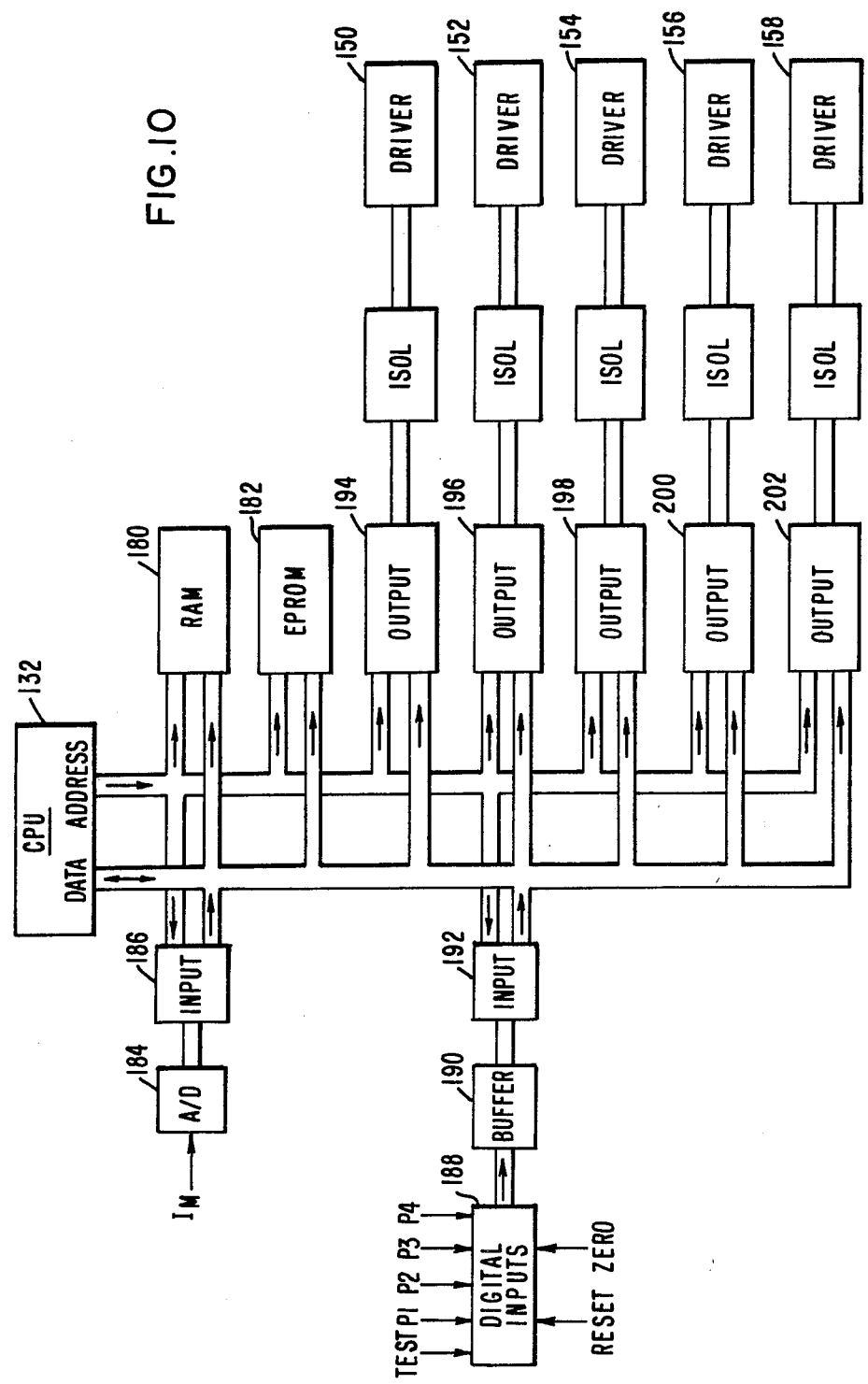
FIG. 10 shows the functional operation of the microprocessor shown in FIG. 8.

In FIG. 10 there is illustrated the functional operation of the microprocessor 132 to control the acceleration operation of propulsion motor 100. The microprocessor 132 includes a RAM memory 180 for the storage of motor operation control signals and an EPROM memory 182 for the storage of executive and application control programs. The analog motor current input signal IM from across the shunt 102 is supplied to an analog to digital converter 184 and then to input port 186. The digital input signals from the zero position sensor 130, the reset switch 138, the test contact 170, and the acceleration rate selection contacts P1, P2, P3 and P4 are supplied through the digital input 188, the buffer 190 and the input port 192. The respective output signals to the stepper motor field coils are provided through output ports 194, 196, 198 and 200 to the drivers 150, 152, 154 and 156. The output signal to the line switch relay coil 144 is provided through output port 202 to the driver 158.

The stepper motor 126 has four field coils but the design of the rotor has many teeth and the design of the field magnetic circuit has corresponding teeth such that by suitable energization of the four field coils, the positional movement of the rotor has 200 steps per rotation, so this actual application provides angular movement of the cam shaft 128 of 1.8° per step. The microprocessor outputs very low level signals to the solid state relays, which are transistor driver circuits energizing of the stepping motor field coils. When the microprocessor wants the stepping motor to rotate, it keeps track of which coils were energized and then determines what is the next desired operational state in order to drive the stepper motor in any particular direction and it then energizes the proper field coils to provide that next state. When the microprocessor 132 is powered on, the microprocessor 132 does not know where the stepper motor 126 is positioned, and the stepper motor 126 does not know where it is positioned. In order to be able to keep track of where the motor 126 is at all times, the first thing that happens is the microprocessor 132 will start rotating the stepper motor 126 and the cam shaft 128 until it gets to the reference zero position. From them on the microprocessor 132 keeps track of how many steps of rotation the motor 126 moves and in which direction or directions, so the current position of the stepper motor 126 and the cam shaft 128 is known and that intelligence is used in the control of the propulsion motor control system. This operation of the microprocessor 132 because it can keep track of the present position of cam shaft 128 eliminates all of the feedback limit switches required by the relay logic apparatus operative with the prior art cam control systems for propulsion motors. The OFF, P1, P2, P3 and P4 inputs from the rotary switch 140 can be related to the train line signals typically supplied to a propulsion motor control.

At the OFF position nothing is energized, and at each of the P1, P2, P3 and P4 positions there is provided a certain acceleration rate performance of the car. For example, the P1 position could provide minimal acceleration and be the minimal speed position of the system to cause the line switch 120, which is really the switch that turns the system ON, to pull in and apply voltage through all of the resistors 104, 106, 108, 110, 112, 114, 116 and 118 which are still in the circuit and the motor will accelerate at a very slow rate, with no advancement of the cam shaft 128 and none of the switches are taken out and so this is the slowest speed that the motor 100 can be run. The P1, P2, P3 and P4 signals each provide different acceleration rate requests. When P2 is selected, again the line switch 120 pulls in and the motor 100 will start to accelerate and there will be a current associated with the pulling in of the line switch 120, and as the motor 100 accelerates, that current will drop off because of the action of the motor. The microprocessor 132 senses the current of the motor 100 dropping off through its analog input port 186 and when that current gets below a certain requested threshold current value determined by one of P1, P2, P3 or P4, the microprocessor 132 determines that the stepper motor 126 and the cam shaft 128 should rotate to short out the next resistors. This shorting out of the resistor causes the current of the motor 100 to rise, and then again the current will start falling down and when it gets below this threshold again, the next resistor is cut out and this operation is repeated as the cam unit progressively changes position to maintain the requested acceleration rate. The function of the respective P1, P2, P3 and P4 inputs is to vary that threshold current level at which the resistor switch takes place. The reset button is used by the operator to cause the cam shaft 128 to reset to the zero position.

The following table I illustrates suitable threshold current valves for each of the P1, P2, P3 and P4 acceleration rate inputs.

TABLE I

| INPUT | TRIP POINT |
| --- | --- |
| P1 | 115 |
| P2 | 120 |
| P3 | 128 |
| P4 | 140 |

The threshold trip points in the above table represent the count outputs of the analog to digital converter 186 in relation to desired threshold current levels.

The following table II illustrates a representation of the desired threshold current levels in relation to provided limits of angular motion of the cam shaft to determine the desired closing of resistor shunting switches.

TABLE II

| INPUT | SWITCH CLOSINGS |
| --- | --- |
| P1 | No rotation. Only line switch closes. |
| P2 | Two of eight switches close. |
| P3 | Four additional switches close. |
| P4 | Two additional switches close. |

Figure 11:
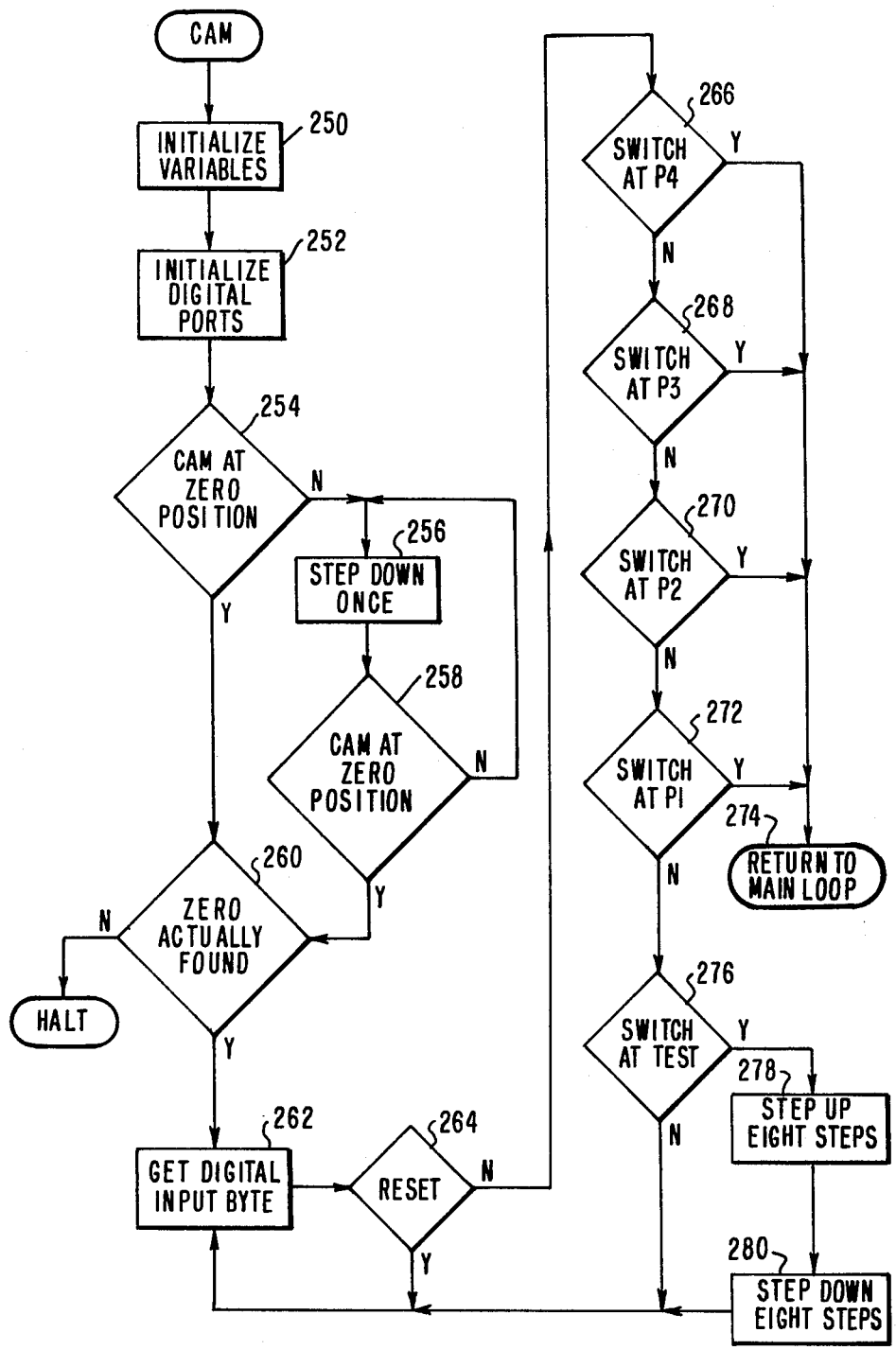
FIG. 11 shows a flow chart to illustrate the operation of the propulsion cam control program provided for the microprocessor shown in FIG. 8.

In FIG. 11 there is shown a flow chart to illustrate the operation of the cam control program provided for the microprocessor 132 shown in FIG. 8. The program is called CAM and the first block 250 sets the variables used by the microprocessor to their initial values. Block 252 sets the addresses of the input ports and the addresses of the output ports. At block 254, a check is made to see if the cam is at the zero position. The program rotates the cam shaft 128 one step at a time at block 256, and after each step, a check is made at block 258 to see if the zero position sensor has been reached. If not, the program steps the cam again at block 256 and will continue to step the cam until the cam shaft 128 reaches zero position. If the zero position is not reached after an appropriate number of steps, the microprocessor halts because the microprocessor 132 cannot function properly if it does not know where the cam shaft 128 is positioned. So having reached the zero position, at block 262 the digital input byte is obtained, which contains all of the input information. The illustrated propulsion control system as shown in FIG. 8 is simple enough that eight bits of input data are adequate to take care of the acceleration rates P1, P2, P3 and P4, the reset and the zero position of the cam shaft 128. At block 264 a check is made to see if the reset button 138 was pushed, if it was the program goes back to block 262. If not, at each of blocks 266, 268, 270 and 272 checks are made to see if one of the rate inputs P1, P2, P3 and P4 was actuated and if yes the program jumps at 274 to the main loop portion of the program shown in FIG. 12. If the test position was selected at block 276, the cam controller 124 then goes through a predetermined test routine to have the microprocessor 132 do some diagnostics at blocks 278 and 280 and to cause the stepper motor 126 to increment eight steps up and eight steps down to rotate the cam shaft 128 through the positions of normal rotation to see that the switches are functioning properly. A typical cam controller 124 for a transit car would have twenty such angular positions and maybe more than that as required to provide desired switching from series to parallel motor connections and then include some field shunting action too, but the principle of operation would be substantially the same.

Figure 12:
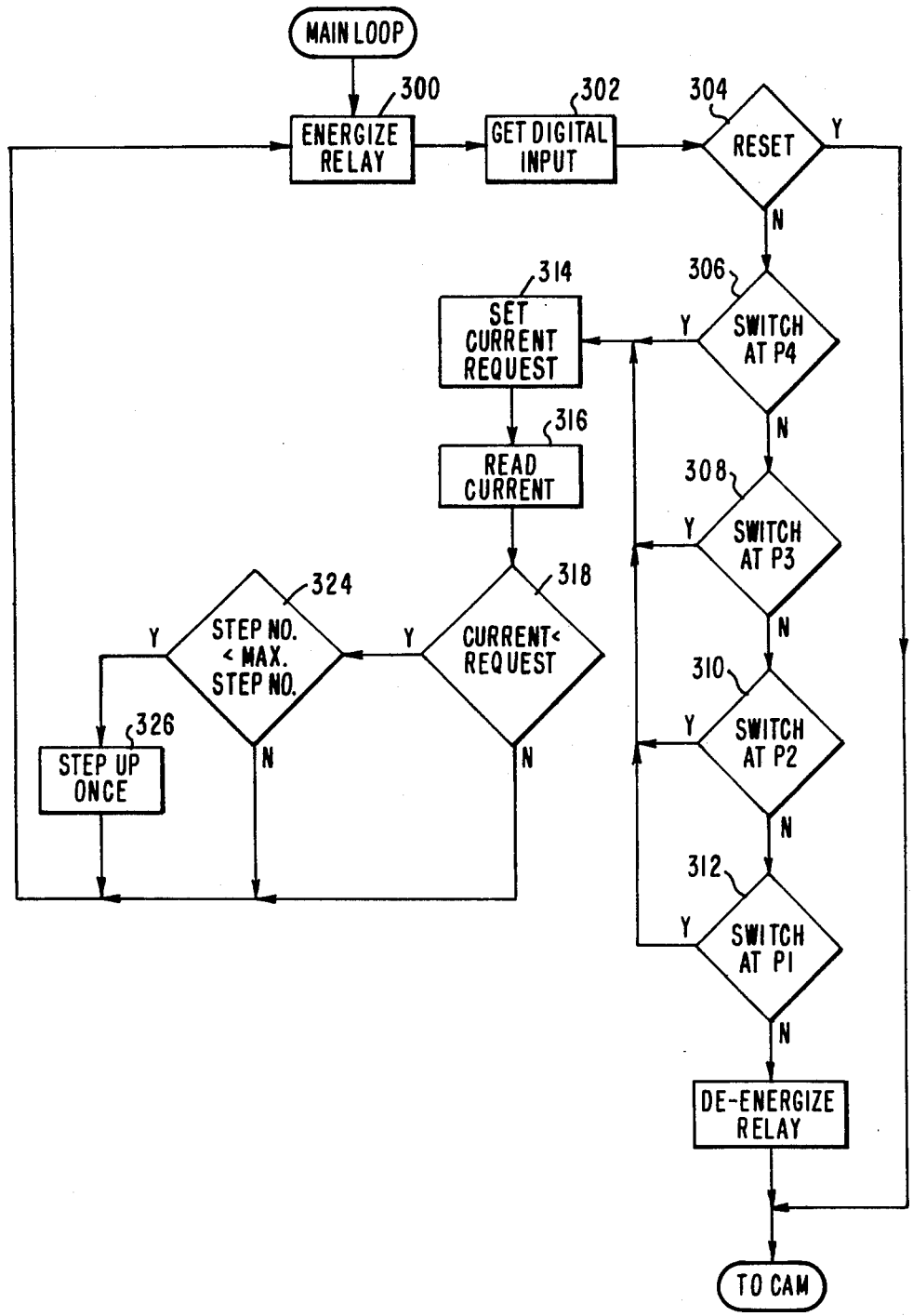
FIG. 12 shows a flow chart to illustrate the operation of the main loop control program provided for the microprocessor shown in FIG. 8.

In FIG. 12 there is a shown a flow chart to illustrate the main loop program provided for the microprocessor shown in FIG. 8. At block 300 the line switch relay 144 is energized to cause current to start flowing and the motor 100 to start rotating. At block 302 the digital input byte is obtained again. At block 304 a check is made to see if a reset is requested, and if so the program goes back to the cam program shown in FIG. 11. At each of blocks 306, 308, 310 and 312 a check is made to see if one of the acceleration rates P1, P2, P3 or P4 is selected. There is associated with each of these rates a predetermined requested minimum threshold current level, and the so selected current request is set at block 314. At block 316 the actual motor current is sensed, which would be the analog input current from the motor 100. At block 318 the actual current is checked to see if it is less than the requested current, as determined by one of the rates P1, P2, P3 or P4 being selected. Assuming that the rate selected was P1, the set current request at block 314 will be of a low value. At block 318 if the actual current is not less than the requested current, the program would go back to block 300 and cycle through the loop again. As the motor speeds up, the motor current starts dropping such that the actual current will, at some point, fall below the set current request, so the answer at block 318 will then be yes. The program then goes to block 324 to check if the present cam step position is less than the maximum of eight such steps that can be made. If yes, at block 326 the cam position is incremented once, involving a multiple of stepping motor steps, to cause the next resistor to be shorted out. Since there are only eight positional steps provided for the cam control propulsion system shown in FIG. 8 at some point the eight will be all utilized. The current will continue to fall below the request, but if the operation has exceeded or matched the maximum number of steps, the control no longer will take any more steps. However, if there are still controller steps available, then the cam is rotated to cut out another resistor. The motor current increases each time a resistor is cut out and the program cycles back through again and checks the actual current and this continues until all eight of the controller rotational steps have been taken.

The stepper motor 126 provides essentially digital control of the cam shaft 128 in predetermined increments of angular movement and that is very desirable for cam control of a vehicle propulsion motor 100.

Figure 13:
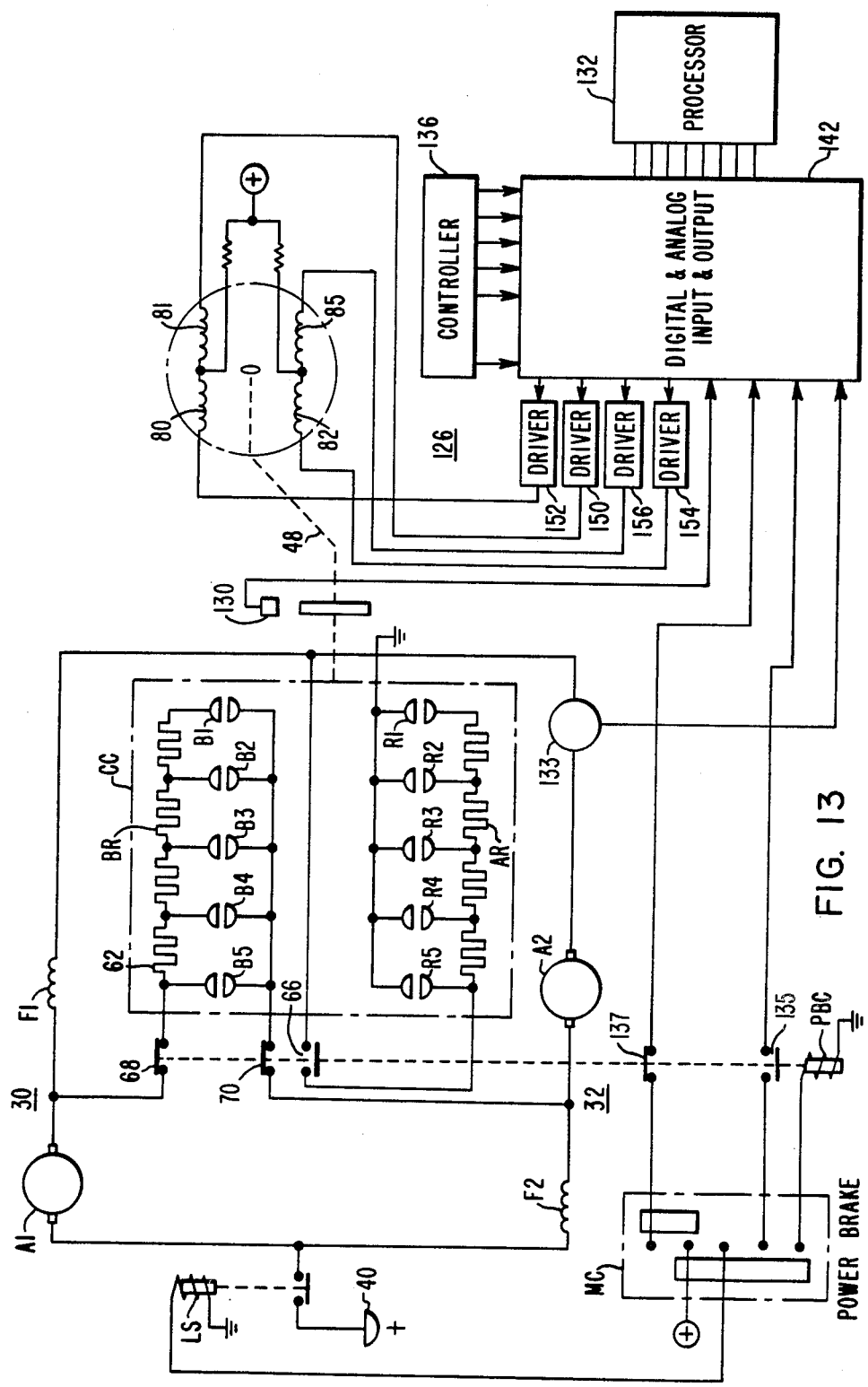
FIG. 13 shows a second embodiment of the present invention.

In FIG. 13 there is shown a second embodiment of the present invention to provide both an acceleration control and a brake control of propulsion motors 30 and 32. The cam controller CC and the master controller MC function similarly to the previous description in relation to FIG. 2, as do the power-brake control switch PBC, the accelerating resistor AR and the braking resistor BR. A stepper motor 126 is coupled with the cam shaft 48 to operate the cam controller CC. The microprocessor 132 senses a power request signal through contacts 135 or a brake request signal through contacts 137, the senses the motor current signal from the current sensor 133 to determine the closing of the resistor shorting switches R1 through R5 for acceleration and B1 through B5 for braking, such as shown in FIG. 3.

Figure 14:
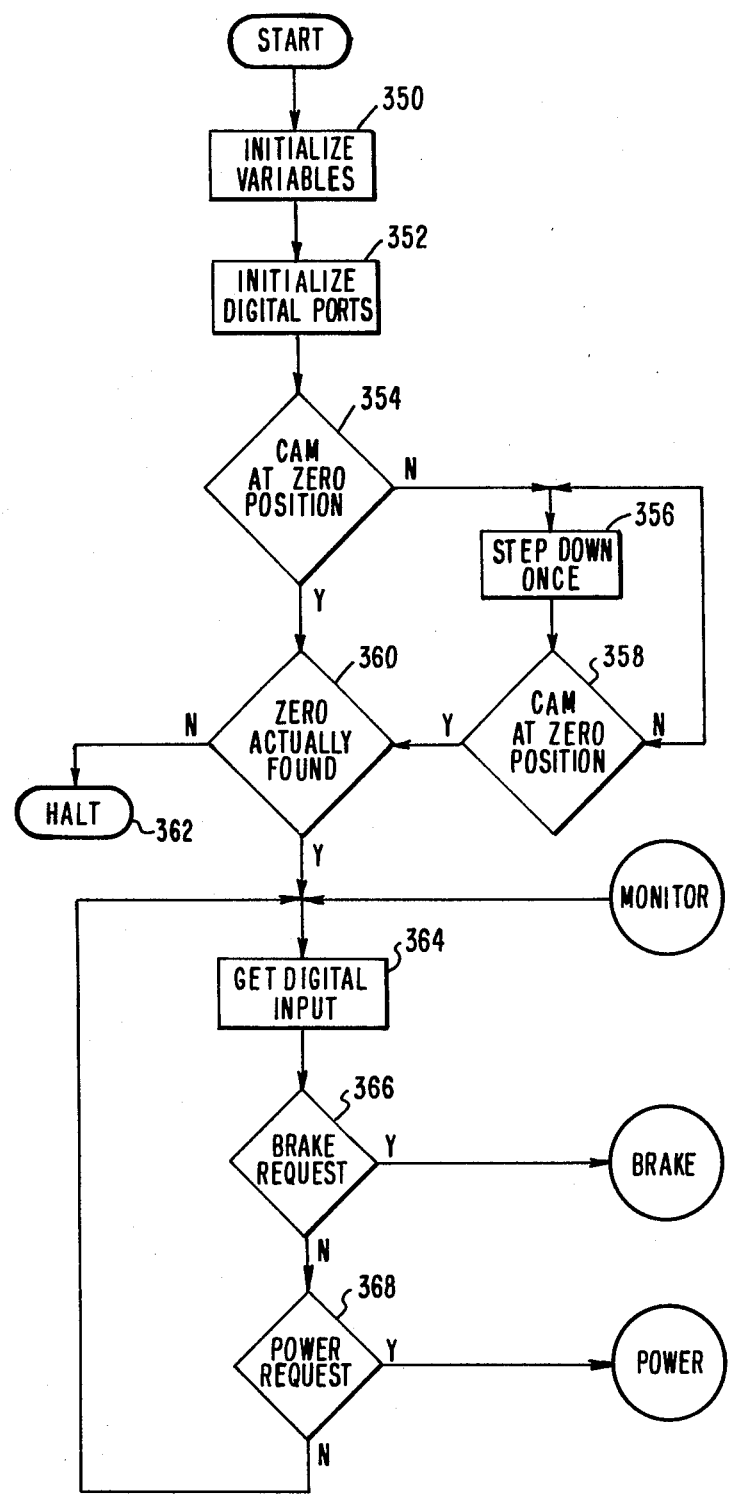
FIG. 14 shows a flow chart to illustrate the operation of the propulsion cam control program provided for the microprocessor shown in FIG. 13.

In FIG. 14 there is shown a flow chart to illustrate the operation of the cam control program provided for the microprocessor 132 shown in FIG. 13. At block 350 the control variables are initialized, and at block 352 the digital ports are initialized. At block 354 a check is made to see if the cam shaft 48 is at the zero position. If not, at block 356 a step down move is made, and at block 358 another check is made to see if the zero position is reached. If not, a series of such steps as required are made at blocks 356 and 358 until the zero position is found. At block 360 a check is made to assure that the zero position is found, and if not a halt is made a block 362. If the zero position is found at block 360, at block 364 the digital inputs are obtained, and at block 366 a check is made to see if a brake operation is requested. If not, at block 368 a check is made to see if a power operation is requested.

Figure 15:
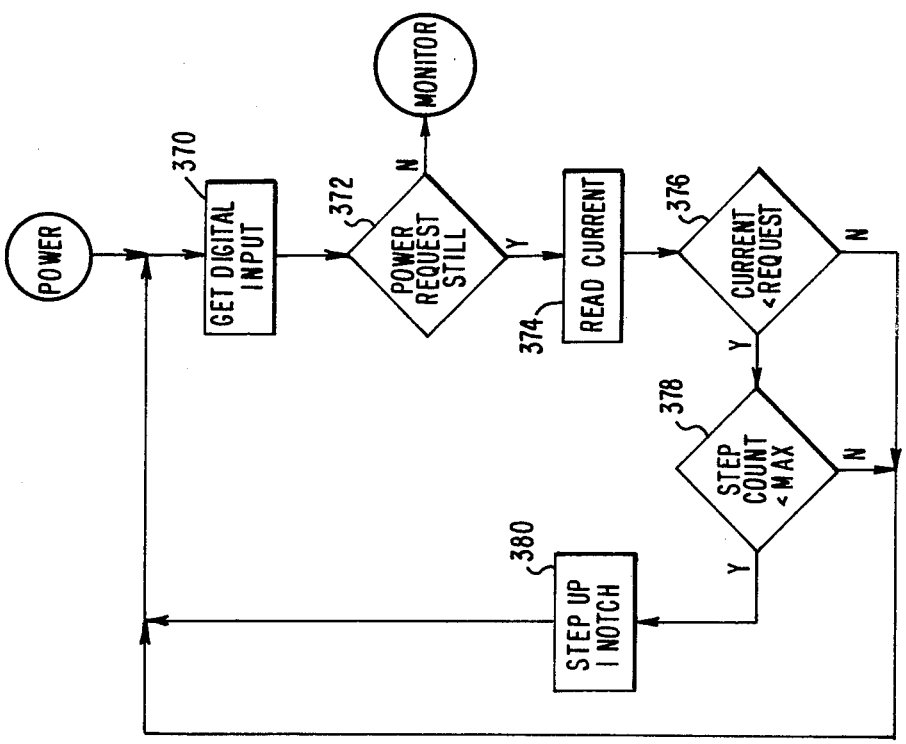
FIG. 15 shows a flow chart to illustrate the operation of the power control program provided for the microprocessor shown in FIG. 13.

If yes at block 368, the program goes to the power control program shown in FIG. 15. At block 370 the digital inputs are obtained. At block 372 a check is made to see if the power operation is still requested. If not, the program goes to the monitor operation and passes through blocks 364, 366 and 368 of FIG. 14 until one of a power or a brake operation is requested. If yes at block 372, then at block 374 the motor current is read from the current sensor 133. At block 376 a check is made to see if the actual motor current is less than the predetermined request threshold current to establish the one desired acceleration rate. If the actual motor current is not less than the requested current at block 376, the operation goes back to block 370. If the motor current is less than the requested current at block 376, at block 378 a check is made to see if the step count so far is less than the maximum of five available steps in accordance with FIG. 13. If yes, at block 380 an additional step up is made, and if not, the program goes back to block 370.

Figure 16:
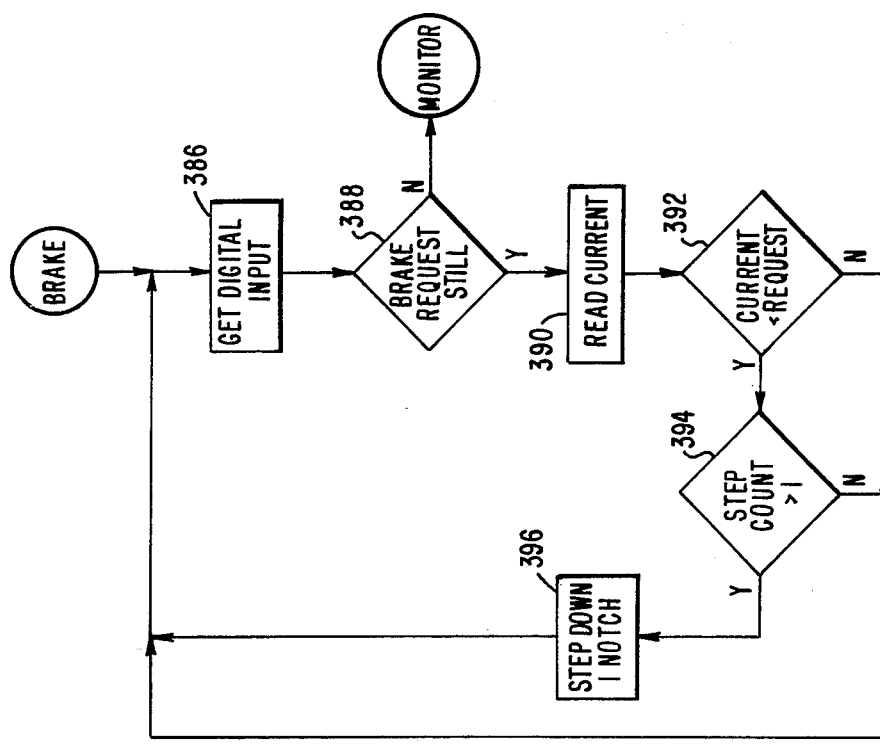
FIG. 16 shows a flow chart to illustrate the operation of the brake control program provided for the microprocessor shown in FIG. 13.

If yes at block 366, the program goes to the brake control program shown in FIG. 16. At block 386 the digital inputs are obtained. At block 388 a check is made to see if the brake operation is still requested. If not, the program goes to the monitor portion of FIG. 14 until one of a power or brake operation is requested. If yes at block 388, at block 390 the motor current is read. At block 392 a check is made to see if the actual motor current is less than the predetermined threshold requested current for the one desired brake rate. If the motor current is not less at block 392, the program goes back to block 386. If the motor current is less at block 392, at block 394 a check is made to see if the step count is greater than one, with one being the first step above the zero position. If yes, at block 396 an additional step down is made, and if not the program does to block 386.

The microprocessor 132 is looking for either a brake or a power command from the PBC switch contacts 135 and 137, and once it gets either one of those it then jumps to the appropriate sub-program in FIG. 15 or in FIG. 16. In these sub-programs in FIG. 15 or 16, the current is compared to the requested current which would be in the program and which would correspond to one particular acceleration rate. If the motor current has dropped off below the requested value, the program then goes over and checks to see if all five of the steps have been used up by the cam controller. So if all of the steps have not been used up, then the microprocessor steps the controller to the next notch and then goes back again, checks to see if the command is still there, and reads the motor current again, and if the motor current has not yet fallen below the requested level then the program just keeps circling around until the motor current is less and then the program just repeats that process. Once the four available power steps have been provided then the program bypasses the stepping operation. The request current is part of the program, it would be a current level which would correspond to the desired acceleration rate or brake rate on the car. Each requested current level could be selected by the controller 136 as a function of the particular switches to be closed by the cam controller CC, which information is initially supplied to the microprocessor by the operator, and the control program would then set the predetermined request current as required by the operator. The brake program is virtually an identical flow chart operation. When the motor current is pulled in through the A to D converter it gets converted to an eight bit number having values from 0 to 255, and in relation to these numbers the current requests are set for the different positions, as shown in above Table I.

An actual operative embodiment of the propulsion motor acceleration cam control apparatus shown in FIG. 8 was built and operated using the following components:

Stepper Motor—Model M112FJ327 supplied by Superior Electric Company of Bristol, Conn.
Drivers—Model K12B supplied by Douglass Randall of Pawcatuck, Conn.
Microprocessor—Z8 Basic Computer Controller supplied by Micromint Corporation of Cedar Hurst, N.Y.

GENERAL DESCRIPTION OF INSTRUCTION PROGRAM LISTING

In the Appendix there is included an instruction program listing that has been prepared to control an electric motor in accordance with the here disclosed control system as shown in FIGS. 11 and 12. The instruction program listing is written in machine code and Basic, both of which can be executed on the Z8 microprocessor computer system. This instruction program listing is included to provide an illustration of one suitable embodiment of the present control system for an electric motor that has actually been prepared. This instruction program listing at the present time is a more or less development program and has not been extensively debugged through the course of practical operation of vehicles on a transit system. It is well known by persons skilled in this art that real time process control application programs may contain some bugs or minor errors, and it is within the skill of such persons and takes varying periods of actual operation time to identify and routinely correct the more critical of these bugs.

Figure 17:
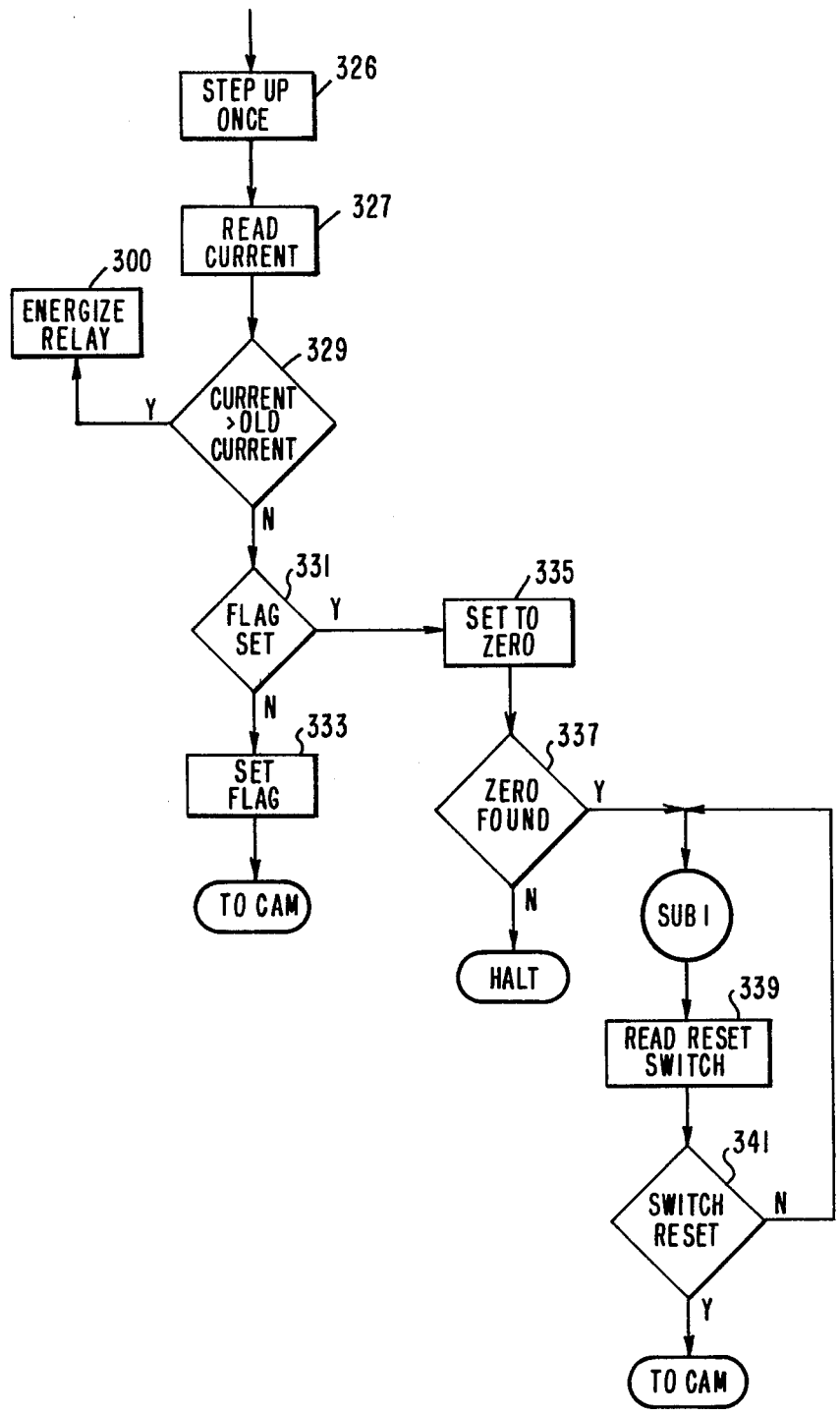
FIG. 17 shows a modification of the main loop control program shown in FIG. 12 to illustrate a failure detection mode of operation.

In FIG. 17 there is shown a flow chart to illustrate a failure detection mode modification for the main loop program shown in FIG. 12 to establish successively that each of the resistor shorting switches of the cam controller 124 and operative with the respective series resistors 104, 106, 108, 110, 112, 114, 116 and 118 is functioning as required and has not failed to provide the desired control of the motor 100. After block 326 shown in FIG. 12, after the new and resulting motor current is read at block 327, and, a check is made at block 329 to see if the new motor current is greater than the old or previous motor current. If yes, the resistor was shorted as desired and the cam controller 124 is operating properly, so a return to the block 300 is made. If not, at block 331 a check is made to see if an operation indicating flag is set, and if not the flag is set at block 333 and a return is made to the cam control program shown in FIG. 11. If the flag is set at block 331, at block 335 the cam shaft 128 is set to the zero position. At block 337, a check is made to see if the zero position is found as indicated by the zero position sensor 130, and if not, the program halts. If yes, the program goes to Sub 1 and at block 339 the reset switch 138 is read. At block 341 a check is made to see if the operator has provided a reset signal from the reset switch 339, and if not the operation goes back to Sub 1. If yes, the operation goes to the cam control program shown in FIG. 11. This modification in FIG. 17 makes sure that the motor current increases after each switch closing operation of the cam controller 124 and to determine that the associated resistor was actually shorted. If the sensed motor current does not increase as expected at this time, a provided flag is set the first time through the modified program and a return is made to the cam control program of FIG. 11. The next time through the modified main loop program shown in FIG. 12 the flag will be set and if the sensed motor current still has not increased, the operation waits for the operator to close the reset switch 138 before again beginning the cam control program shown in FIG. 11.

```
  1 @%1000 = 28
  2 @%1001 = 24
  3 @%1002 = 23
  4 @%1003 = 23
  5 @%1004 = 23
  6 @%1005 = 18
  7 @%1006 = 29
  8 @%1007 = 25
  9 @%1010 = %90
 10 @%1011 = %50
 11 @%1012 = %60
 12 @%1013 = %A0
 13 @%1014 = %91
 14 @%1015 = %51
 15 @%1016 = %61
 16 @%1017 = %A1
113 @%1500=%E6:@%1501=%FD:@%1502=%00
115 @%1503=%70:@%1504=%E8
117 @%1505=%70:@%1506=%E9
119 @%1507=%70:@%1508=%E6
121 @%1509=%70:@%150A=%E7
122 @%150B=%E6:@%150C=%10:@%150D=%02
123 @%150E=%E6:@%150F=%11:@%1510=%D0
124 @%1511=%20:@%1512=%13
125 @%1513=%A6:@%1514=%13:@%1515=%03
127 @%1516=%2B:@%1517=%04
128 @%1518=%FF
129 @%1519=%E6:@%151A=%13:@%151B=%00
131 @%151C=%8C:@%151D=%10
133 @%151E=%9C:@%151F=%10
135 @%1520=%04:@%1521=%13:@%1522=%E9
136 @%1523=%C2:@%1524=%28
137 @%1525=%8D:@%1526=%10
138 @%1527=%ED:@%1528=%15:@%1529=%30
139 @%152A=%E6:@%152B=%13:@%152C=%FF
140 @%152D=%8D:@%152E=%15:@%152F=%44
141 @%1530=%8C:@%1531=%04
142 @%1532=%9C:@%1533=%FF
143 @%1534=%9A:@%1535=%FE
145 @%1536=%8A:@%1537=%FA
147 @%1538=%8C:@%1539=%FF
149 @%153A=%9C:@%153B=%FD
151 @%153C=%82:@%153D=%68
153 @%153E=%56:@%153F=%E6:@%1540=%02
155 @%1541=%ED:@%1542=%15:@%1543=%11
157 @%1544=%50:@%1545=%E7
159 @%1546=%50:@%1547=%E6
161 @%1548=%50:@%1549=%E9
163 @%154A=%50:@%154B=%E8
165 @%154C=%E6:@%154D=%FD:@%154E=%10
167 @%154F=%AF
213 @%1550=%E6:@%1551=%FD:@%1552=%00
215 @%1553=%70:@%1554=%E8
217 @%1555=%70:@%1556=%E9
219 @%1557=%A6:@%1558=%21:@%1559=%01
221 @%155A=%EB:@%155B=%06
223 @%155C=%8C:@%155D=%10
225 @%155E=%9C:@%155F=%10
227 @%1560=%8B:@%1561=%04
229 @%1562=%8C:@%1563=%10
231 @%1564=%9C:@%1565=%14
233 @%1566=%20:@%1567=%13
235 @%1568=%A6:@%1569=%13:@%156A=%03
237 @%156B=%2B:@%156C=%03
239 @%156D=%E6:@%156E=%13:@%156F=%00
241 @%1570=%04:@%1571=%13:@%1572=%E9
243 @%1573=%C2:@%1574=%28
245 @%1575=%8C:@%1576=%04
247 @%1577=%9C:@%1578=%FF
249 @%1579=%9A:@%157A=%FE
251 @%157B=%8A:@%157C=%FA
253 @%157D=%80:@%157E=%14
255 @%157F=%ED:@%1580=%15:@%1581=%57
256 @%1582=%E6:@%1583=%21:@%1584=%00
257 @%1585=%50:@%1586=%E9
259 @%1587=%50:@%1588=%E8
260 @%1589=%E6:@%158A=%FD:@%158B=%10
261 @%158C=%AF
313 @%15A0=%E6:@%15A1=%FD:@%15A2=%00
315 @%15A3=%70:@%15A4=%E8
317 @%15A5=%70:@%15A6=%E9
319 @%15A7=%A6:@%15A8=%21:@%15A9=%01
321 @%15AA=%EB:@%15AB=%06
323 @%15AC=%8C:@%15AD=%10
325 @%15AE=%9C:@%15AF=%10
327 @%15B0=%8B:@%15B1=%04
329 @%15B2=%8C:@%15B3=%10
331 @%15B4=%9C:@%15B5=%14
333 @%15B6=%00:@%15B7=%13
335 @%15B8=%A6:@%15B9=%13:@%15BA=%FF
337 @%15BB=%EB:@%15BC=%03
339 @%15BD=%E6:@%15BE=%13:@%15BF=%03
341 @%15C0=%04:@%15C1=%13:@%15C2=%E9
343 @%15C3=%C2:@%15C4=%28
345 @%15C5=%8C:@%15C6=%04
347 @%15C7=%9C:@%15C8=%FF
349 @%15C9=%9A:@%15CA=%FE
351 @%15CB=%8A:@%15CC=%FA
353 @%15CD=%80:@%15CE=%14
355 @%15CF=%ED:@%15D0=%15:@%15D1=%A7
357 @%15D2=%E6:@%15D3=%21:@%15D4=%00
359 @%15D5=%50:@%15D6=%E9
361 @%15D7=%50:@%15D8=%E8
363 @%15D9=%E6:@%15DA=%FD:@%15DB=%10
365 @%15DC=%AF
110 G=0
115 L=0
120 R=0
125 N=0
128 S=0
132 @246=0
135 L=USR(%1700,S,L):IF L=%FF:STOP
136 @2=0
137 A=@%FFFD
138 B=A
139 A=AND (A,%80)
140 IF A<>0 @2=0:GOTO 137
141 A=B
142 A=AND (A,%40)
143 IF A=0 GOTO 180
145 A=B
147 A=AND (A,%20)
149 IF A=0 GOTO 180
151 A=B
152 A=AND (A,%10)
153 IF A=0 GOTO 180
154 A=B
155 A=AND (A,%08)
156 IF A=0 GOTO 180
157 A=B
159 A=AND (A,%04)
161 IF A=0 GOTO 900
170 GOTO 137
180 @2=1
190 A=@%FFFD
```

```
191 B=A
200 A=AND (A,%80)
210 IF A<>0 @2=0:GOTO 120
220 A=B
230 A=AND (A,%40)
240 IF A=0 C=154:G=8:GOTO 320
250 A=B
260 A=AND (A,%20)
270 IF A=0 C=154:G=6:GOTO 320
280 A=B
290 A=AND (A,%10)
300 IF A=0 C=130:G=4:GOTO 320
302 A=B
304 A=AND (A,%08)
306 IF A=0 C=125:G=0:GOTO 320
310 @2=0:GOTO 125
320 GOSUB 960
325 P=D
340 IF D<C IF N<G:GOTO 700
350 IF D>=(C+30) IF N>1:GOTO 800
355 IF N>G GOTO 800
360 GOTO 190
700 S=@(%1000 + N)
705 @%21=0
710 IF N>1 THEN GOTO 730
715 Q=0
720 Q=Q+1
725 IF Q<25 GOTO 720
730 L=USR(%17A0,S,L)
735 N=N+1
737 GOSUB 960
739 IF D>P+2 GOTO 190
741 IF R=1 GOTO 750
743 R=1
745 GOTO 125
750 L=USR(%1700,S,L):IF L=%FF:STOP
755 @2=2
760 A=@%FFFD
765 A=AND(A,%80)
770 IF A=0 :GOTO 760
775 @2=0
780 R=0:N=0:S=0
785 GOTO 137
800 N=N-1
805 S=@(%1000+N)
806 @%21=0
810 L=USR(%1750,S,L)
850 GOTO 190
900 S=@(%1000+N)
905 Q=0
910 Q=Q+1
915 IF Q<35 GOTO 910
917 @%21=1
920 L=USR(%17A0,S,L)
925 N=N+1
930 IF N<8 GOTO 900
935 N=N-1
940 S=@(%1000+N)
942 @%21=1
943 Q=0
944 Q=Q+1
945 IF Q<35 GOTO 944
946 L=USR(%1750,S,L)
950 IF N>0 GOTO 935
952 @2=0
955 GOTO 137
960 E=0:T=0
965 @%BF00=0
970 D=@%BF00
975 E=E+D
980 T=T+1
985 IF T<2 GOTO 965
990 D=E/2
995 RETURN
```

We claim:

1. A control apparatus for an electric motor operative with a power source for supplying current to determine the operation of that motor in accordance with a plurality of input requested currents corresponding to respective desired motor operations, the combination of:

current control means including a plurality of resistors connected in a series circuit between said power source and the electric motor for establishing the actual electric motor current, cam controller means coupled with the current control means and movable through successive angular positions for sequentially removing one or more selected resistors from said circuit, stepping motor means coupled with the cam controller means for providing a predetermined angular position movement of said cam controller means to determine each sequential removal of at least one of said resistors to control the electric motor current, and control means for establishing an initial position of the cam controller means and responsive to each one of said input requested currents for energizing the stepping motor means when the actual electric motor current is less than said one requested current to determine a predetermined angular position movement of the controller means as required to establish the actual electric motor current to provide the desired electric motor operation corresponding to said one requested motor current.

2. The control apparatus of claim 1, with each requested current in relation to one of said desired electric motor operations providing a different desired motor acceleration.

3. The control apparatus of claim 1, with the cam controller including a plurality of shunt switches respectively provided for said resistors, and with the control means energizing the stepping motor means to shunt selected resistors out of the series circuit in response to the actual motor current decreasing below said one requested motor current.

4. The control apparatus of claim 1, with each angular position movement decreasing the resistance of said series circuit by removing one or more of said resistors to increase the actual motor current above said one requested motor current.

5. The control apparatus of claim 1, with each angular position movement of the cam controller means increasing the actual motor current above said one requested motor current in response to the actual motor current decreasing below said one requested motor current.

6. The control apparatus of claim 1, with the control means initially being operative to position the cam controller means to said initial position at which all of said resistors are connected in said series circuit with the motor.

7. The control apparatus of claim 1, with the control means being responsive to a plurality of requested motor currents in accordance with respective different desired motor operations and providing a selected one of said desired motor operations by comparing the actual motor current to said one requested motor current corresponding with the latter said desired motor operation.

8. The control apparatus of claim 1, with the control means responding to the new actual motor current after each angular position movement to determine if that new actual motor current is greater than the actual motor current previous to said position movement for determining the operation of said motor.

9. The control apparatus of claim 8, with the control means setting the angular position of the cam controller means to said initial position when the new motor current is determined not to be greater than the previous motor current.

10. The control apparatus of claim 1, including:
means providing one of a power request signal and a brake request signal,
with said control means being responsive to the power request signal to move angularly the cam controller means in a first direction, and
with said control means being responsive to the brake request signal to move angularly the cam controller means in a second direction.

* * * * *